(12) United States Patent
Ling (10) Patent No.: US 8,339,777 B2
(45) Date of Patent: Dec. 25, 2012

(54) PORTABLE ELECTRONIC DEVICE WITH IMPROVED PIVOTING RANGE

(75) Inventor: Cheng-Nan Ling, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 280 days.

(21) Appl. No.: 12/873,319

(22) Filed: Sep. 1, 2010

(65) Prior Publication Data

US 2011/0255221 A1 Oct. 20, 2011

(30) Foreign Application Priority Data

Apr. 19, 2010 (TW) ................................ 99112165 A (51) Int. Cl.
*G06F 1/16* (2006.01)
(52) U.S. Cl. ..................................... 361/679.27; 16/340
(58) Field of Classification Search ............. 361/679.01, 361/679.27; 16/337, 338, 340
See application file for complete search history.

(56) References Cited

U.S. PATENT DOCUMENTS

| | | | | |
|---|---|---|---|---|
| 5,268,817 A * | 12/1993 | Miyagawa et al. | ...... | 361/679.07 |
| 5,481,430 A * | 1/1996 | Miyagawa et al. | ...... | 361/679.09 |
| 5,719,799 A * | 2/1998 | Isashi | ............................ | 708/105 |
| 5,987,704 A * | 11/1999 | Tang | ................................ | 16/354 |
| 6,253,419 B1 * | 7/2001 | Lu | ...................................... | 16/340 |
| 7,239,504 B2 * | 7/2007 | Schlesener et al. | ...... | 361/679.09 |
| 7,290,310 B2 * | 11/2007 | Yamaguchi | ...................... | 16/273 |
| 7,602,606 B2 * | 10/2009 | Schlesener et al. | ...... | 361/679.57 |
| 7,667,959 B2 * | 2/2010 | Pelkonen | ................... | 361/679.27 |
| 2005/0122671 A1 * | 6/2005 | Homer | ........................... | 361/681 |
| 2008/0134468 A1 * | 6/2008 | Chen et al. | ...................... | 16/340 |
| 2010/0232096 A1 * | 9/2010 | Chen | ......................... | 361/679.01 |

* cited by examiner

*Primary Examiner* — Lisa Lea Edmonds
(74) *Attorney, Agent, or Firm* — Jianq Chyun IP Office (57) ABSTRACT

A portable electronic device includes a first body, a first pivot element fixed to the first body, a shaft, a second pivot element and a second body fixed to the second pivot element. The shaft having a first block is pivoted to the first pivot element. The second pivot element having a second block is pivoted to the shaft. When the second body covering the first body rotates together with the second pivot element pivoting relatively to the shaft to form a first included angle between the first and second bodies, the second block leans against the first block to restrict the relative pivoting of the second pivot element and the shaft. Then, the second body rotates together with the shaft pivoting relatively to the first pivot element to form a second included angle greater than the first included angle between the first and second bodies.

8 Claims, 9 Drawing Sheets

PORTABLE ELECTRONIC DEVICE WITH IMPROVED PIVOTING RANGE

CROSS-REFERENCE TO RELATED APPLICATION

This application claims the priority benefit of Taiwan application serial no. 99112165, filed on Apr. 19, 2010. The entirety of the above-mentioned patent application is hereby incorporated by reference herein and made a part of this specification.

BACKGROUND OF THE INVENTION

1. Field of the Invention

The invention relates to an electronic device and more particularly, to a portable electronic device.

2. Description of Related Art

Owing to advancement of semiconductor elements and display technologies, electronic devices have been continuously developed toward the trend of miniaturization, multiple functions, and portability. The most common portable electronic device includes a personal digital assistant (PDA), a mobile phone, a notebook computer, and so forth. To comply with the requirement for compactness, the portable electronic device often has a foldable design to reduce its dimensions. For instance, an ordinary notebook computer mainly comprises a host and a display device that are pivotally connected to each other. Through relative rotation of the host and the display device, the notebook computer is easy to be carried when the host and the display device are folded. The display device (acting as an upper lid) is opened for operation when a user intends to use the notebook computer.

Figure 1A:
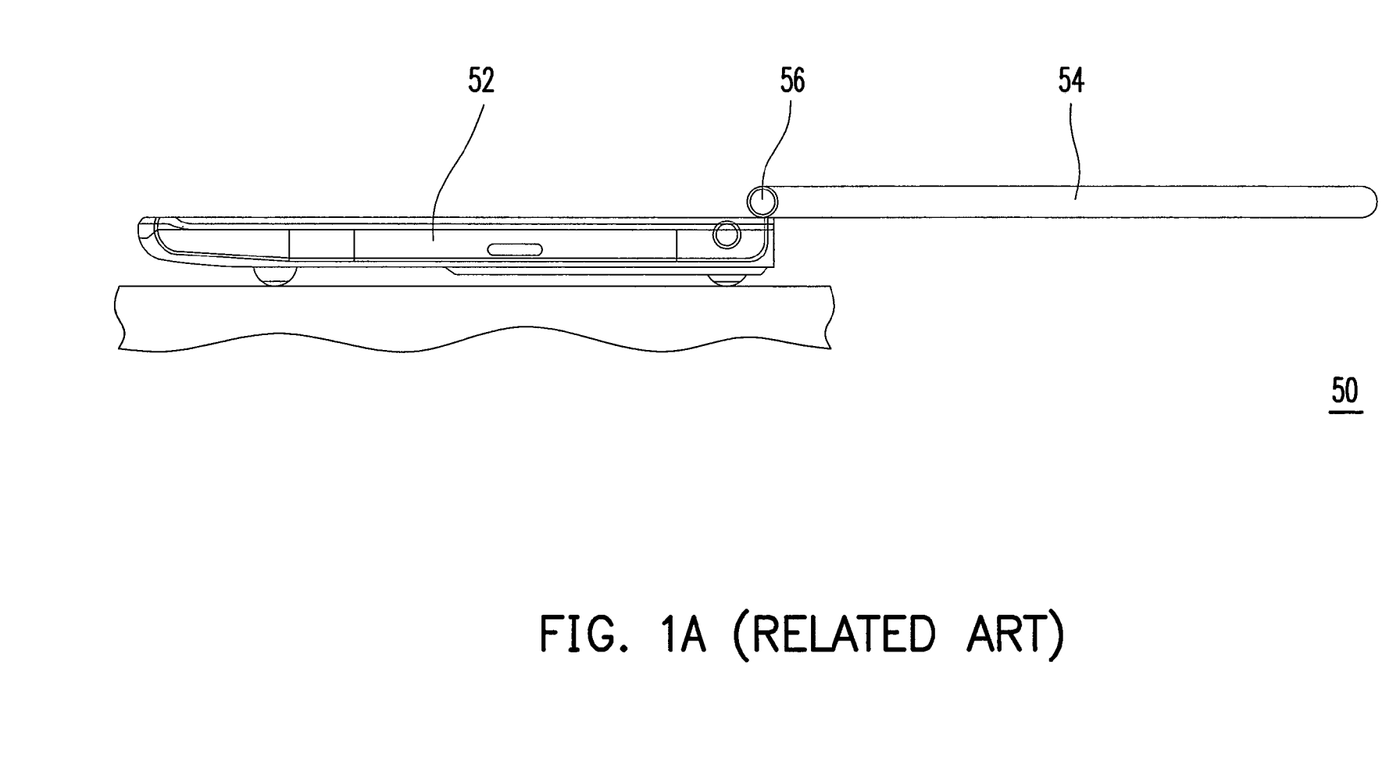
FIG. 1A is a side view illustrating a conventional notebook computer.
Figure 1B:
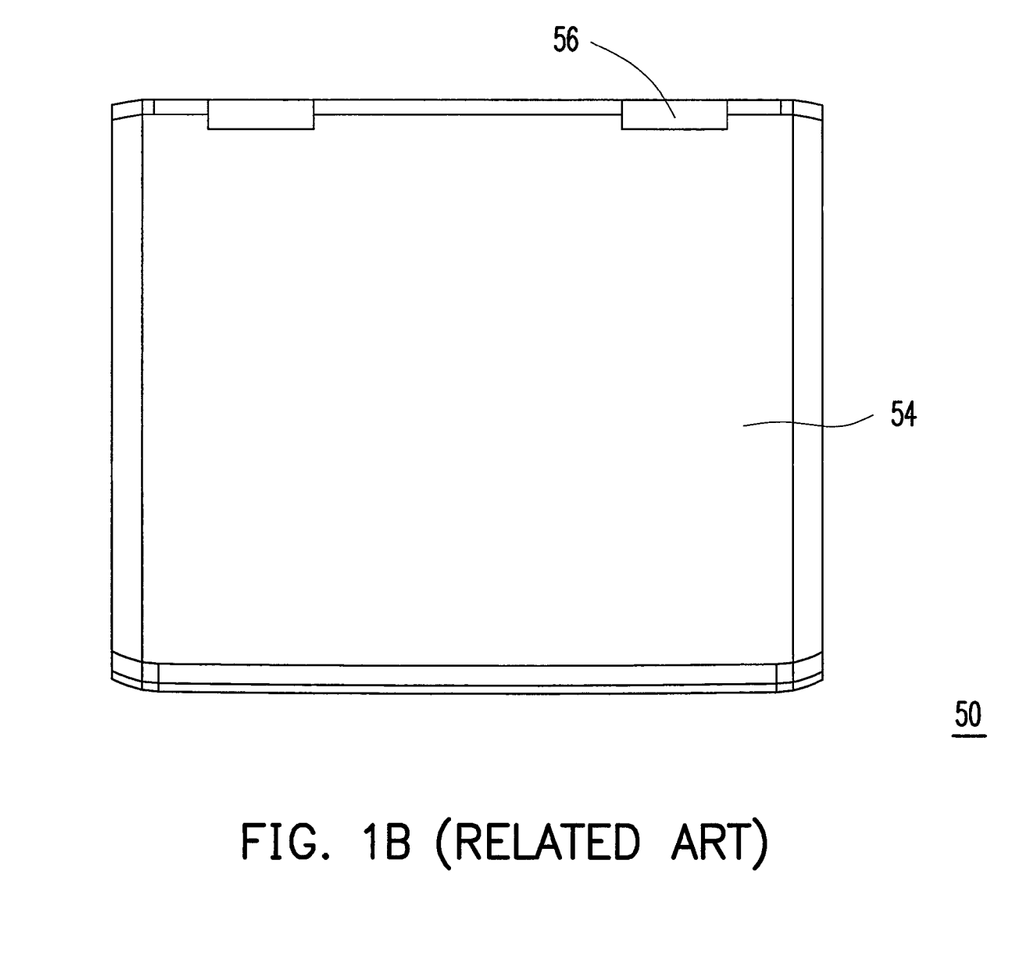
FIG. 1B is a top view illustrating the notebook computer depicted in FIG. 1A in a folded state.

FIG. 1A is a side view illustrating a conventional notebook computer. FIG. 1B is a top view illustrating the notebook computer depicted in FIG. 1A in a folded state. With reference to FIG. 1A, a shaft 56 between the host 52 and the display device 54 of the notebook computer 50 is disposed above the host 52, such that the host 52 can pivot relatively to the display device 54 to form a 180-degree included angle as shown in FIG. 1A. However, when the notebook computer 50 is in a folded state, as indicated in FIG. 1B, the location of the shaft 56 may disfigure the notebook computer 50.

Figure 2A:
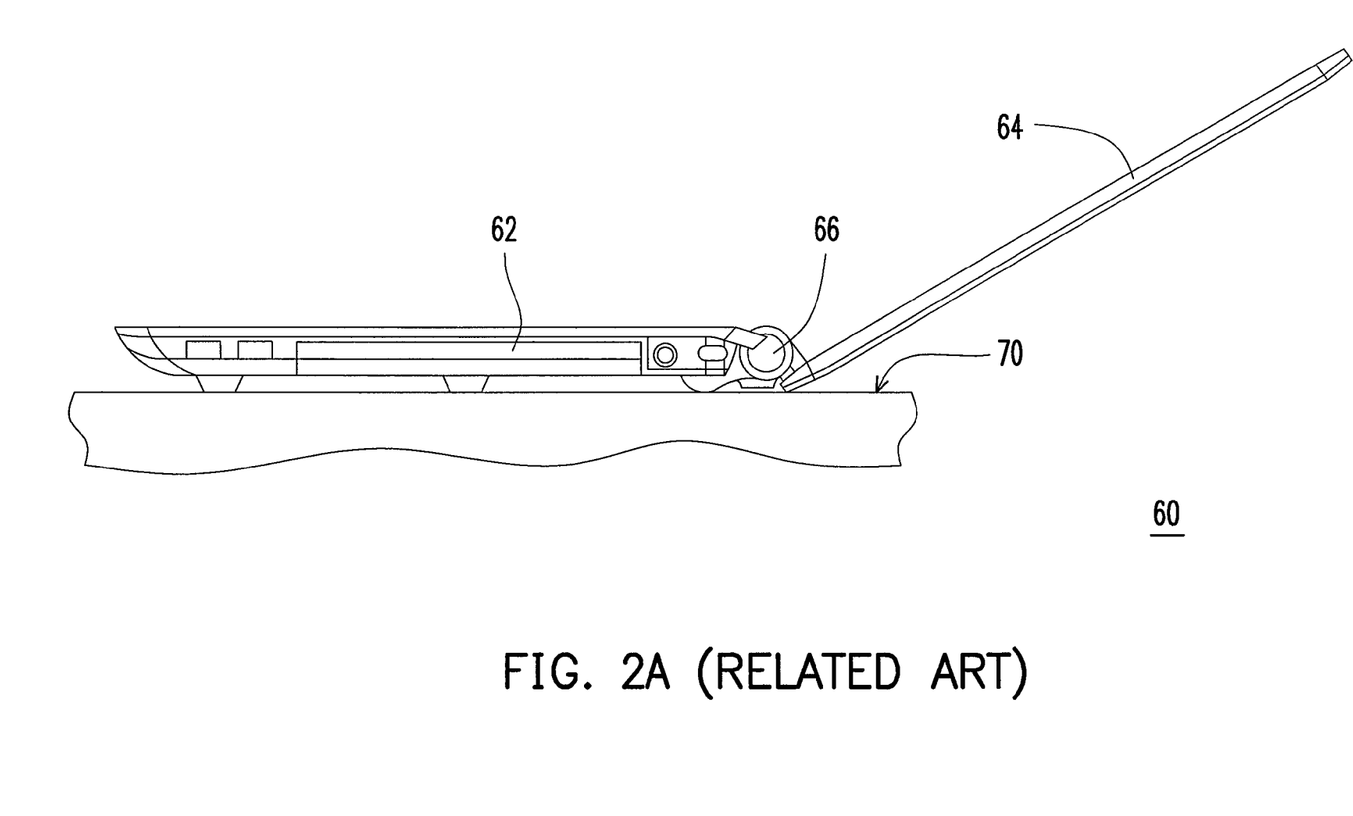
FIG. 2A is a side view illustrating another conventional notebook computer.
Figure 2B:
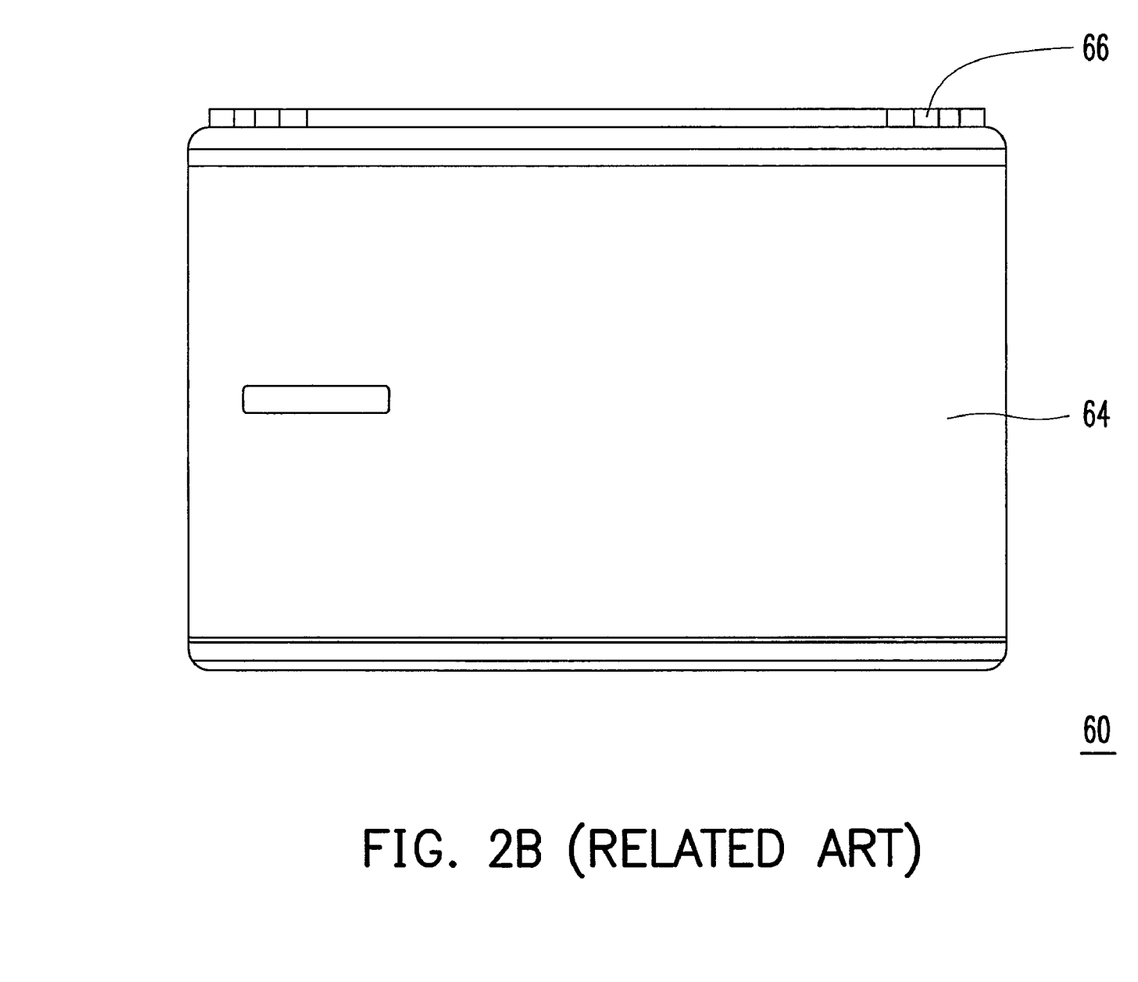
FIG. 2B is a top view illustrating the notebook computer depicted in FIG. 2A in a folded state.

FIG. 2A is a side view illustrating another conventional notebook computer. FIG. 2B is a top view illustrating the notebook computer depicted in FIG. 2A in a folded state. With reference to FIG. 2A, a shaft 66 between the host 62 and the display device of the notebook computer 60 is disposed at the rear of the host 62, such that the notebook computer 60 in a folded state (shown in FIG. 2B) can remain embellished without being disfigured by the shaft 66. Nevertheless, when the display device 64 pivots relatively to the host 62 to the location indicated in FIG. 2A, the pivoting is interrupted and discontinued by a tabletop 70. As such, the host 62 and the display device 64 of the notebook computer 60 cannot pivot relatively to each other to form the 180-degree included angle therebetween.

SUMMARY OF THE INVENTION

The invention is directed to a portable electronic device which has the embellished appearance and ensures the relative pivoting range of two bodies.

The invention provides a portable electronic device including a first body, a first pivot element, a shaft, a second pivot element, a second body, and a battery. The first pivot element is fixed to the first body. The shaft has a first pivot, a second pivot, and a first block. The first pivot is pivotally connected to the first pivot element along a first axis. The shaft is suitable for resisting a first friction force between the first pivot and the first pivot element and pivots relatively to the first pivot element. The second pivot element has a second block. Here, the second pivot element is pivotally connected to the second pivot along a second axis substantially parallel to the first axis. Besides, the second pivot element is suitable for resisting a second friction force between the second pivot and the second pivot element and pivots relatively to the shaft. The second friction force is less than the first friction force. The second body is fixed to the second pivot element. When the second body covering the first body rotates together with the second pivot element that pivots relatively to the shaft to form a first included angle between the first and the second bodies, the second block leans against the first block to restrict the relative pivoting of the second pivot element and the shaft. After the second block leans against the first block, the second body continues to rotate together with the shaft that pivots relatively to the first pivot element to form a second included angle between the first and the second bodies, and the second included angle is greater than the first included angle. The battery is disposed at the rear of the first body, and the battery and the second axis are coaxial.

According to an embodiment of the invention, the shaft has a hole at the first pivot, and the first pivot element passes through the hole to pivotally connect the first pivot.

According to an embodiment of the invention, the first pivot element includes a base and a column. The base is fixed to the first body and has an assembling hole. The column is inserted into the assembling hole, passes through the hole at the first pivot, and is pivotally connected to the first pivot.

According to an embodiment of the invention, the shaft has a hole at the second pivot, and the second pivot element passes through the hole at the second pivot to pivotally connect the second pivot.

According to an embodiment of the invention, the second included angle is substantially equal to 180 degrees.

The invention provides a portable electronic device including a first body, a first pivot element, a shaft, a second pivot element, a second body, and a battery. The first pivot element is fixed to the first body. The shaft has a first pivot, a second pivot, and a first block, wherein the first pivot is pivotally connected to the first pivot element along a first axis. The second pivot element has a second block and is pivotally connected to the second pivot along a second axis substantially parallel to the first axis. The second body is fixed to the second pivot element. When the second body covering the first body rotates together with the second pivot element that pivots relatively to the shaft to form a first included angle between the first and the second bodies, the second block leans against the first block to restrict the relative pivoting of the second pivot element and the shaft. After the second block leans against the first block, the second body continues to rotate together with the shaft that pivots relatively to the first pivot element to form a second included angle between the first and the second bodies, and the second included angle is greater than the first included angle. The battery is disposed at the rear of the first body, and the battery and the second axis are coaxial.

The invention provides a portable electronic device including a first body, a first pivot element, a shaft, a second pivot element, and a second body. The first pivot element is fixed to the first body. The shaft has a first pivot, a second pivot, and a first block. The first pivot is pivotally connected to the first pivot element along a first axis. The shaft is suitable for resisting a first friction force between the first pivot and the first pivot element and pivots relatively to the first pivot element. The second pivot element has a second block. The second pivot element is pivotally connected to the second pivot along a second axis substantially parallel to the first axis. Besides, the second pivot element is suitable for resisting a second friction force between the second pivot and the second pivot element and pivots relatively to the shaft. The second friction force is less than the first friction force. The second body is fixed to the second pivot element. When the second body covering the first body rotates together with the second pivot element that pivots relatively to the shaft to form a first included angle between the first and the second bodies, the second block leans against the first block to restrict the relative pivoting of the second pivot element and the shaft. After the second block leans against the first block, the second body continues to rotate together with the shaft that pivots relatively to the first pivot element to form a second included angle between the first and the second bodies, and the second included angle is greater than the first included angle.

The invention provides a portable electronic device including a first body, a first pivot element, a shaft, a second pivot element, and a second body. The first pivot element is fixed to the first body. The shaft has a first pivot, a second pivot, and a first block, wherein the first pivot is pivotally connected to the first pivot element along a first axis. The second pivot element has a second block and is pivotally connected to the second pivot along a second axis substantially parallel to the first axis. The second body is fixed to the second pivot element. When the second body covering the first body rotates together with the second pivot element that pivots relatively to the shaft to form a first included angle between the first and the second bodies, the second block leans against the first block to restrict the relative pivoting of the second pivot element and the shaft. After the second block leans against the first block, the second body continues to rotate together with the shaft that pivots relatively to the first pivot element to form a second included angle between the first and the second bodies, and the second included angle is greater than the first included angle.

Based on the above, the first pivot element and the second pivot element are respectively fixed to the first body and the second body according to this invention, and the first pivot element and the second pivot element are pivotally connected to the shaft along the first axis and the second axis, respectively. The second body can rotate relatively to the first body along the second axis, so as to form the first included angle between the first and the second bodies. After that, the second body can rotate relatively to the first body along the first axis, so as to form the second included angle between the first and the second bodies. The second included angle is greater than the first included angle. When the rotation of the second body is interrupted by the tabletop, the second body cannot rotate along the second axis, such that the second body is horizontally unfolded to form a 180-degree included angle between the first and the second bodies. At this time, the second body can rotate along the first axis, such that the second body is horizontally unfolded to form a 180-degree included angle between the first and the second bodies. Namely, in this invention, the relative pivoting range of the first body and the second body can be increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
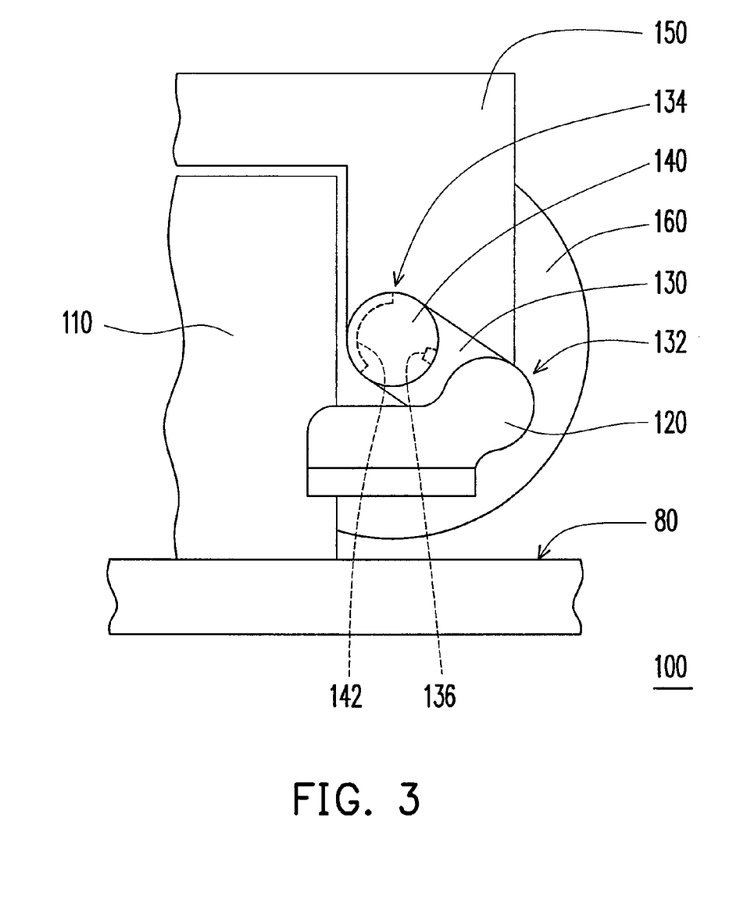
FIG. 3 is a side view illustrating a portable electronic device according to an embodiment of the application.
Figure 4:
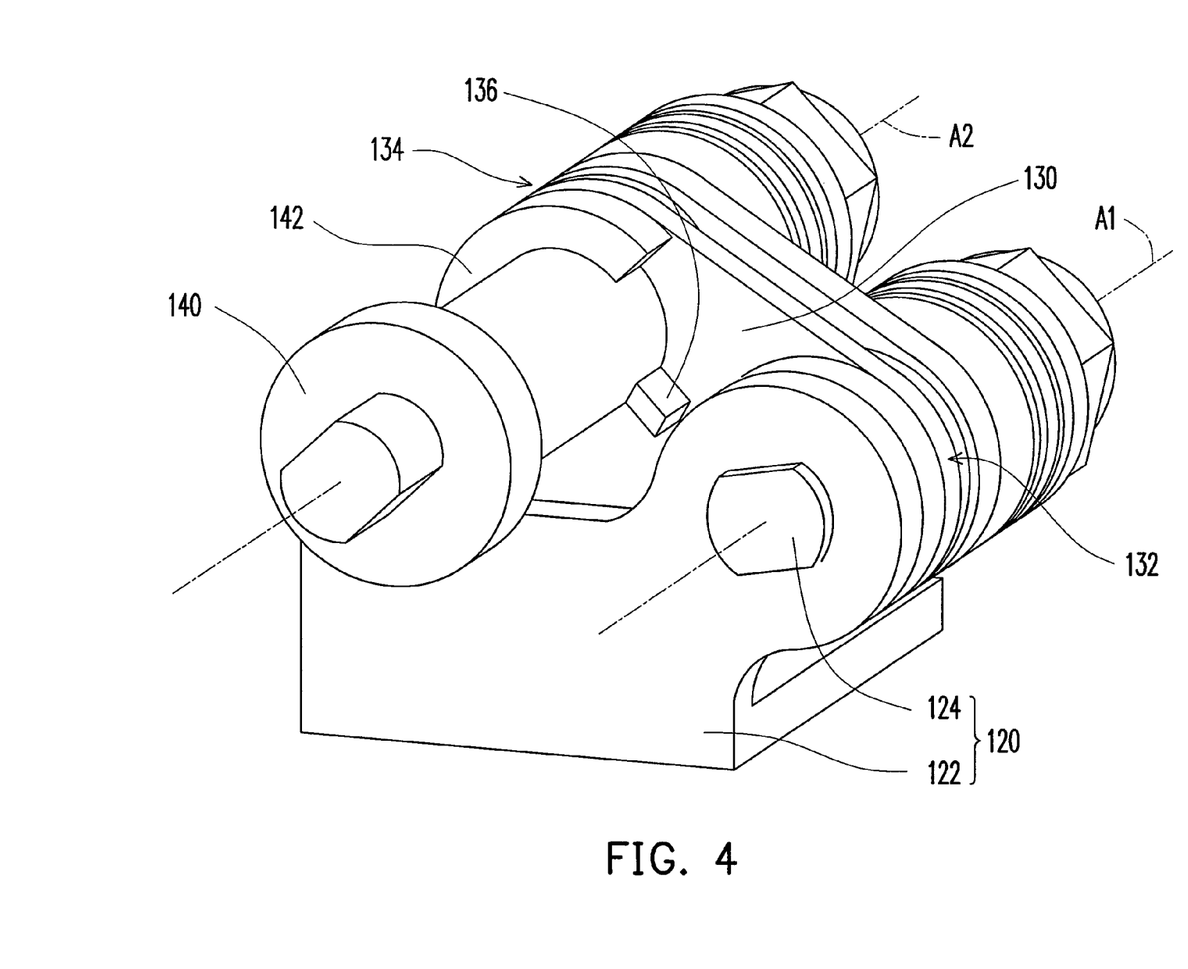
FIG. 4 is a three-dimensional view illustrating some components in the portable electronic device depicted in FIG. 3.

FIG. 3 is a side view illustrating a portable electronic device according to an embodiment of the application. FIG. 4 is a three-dimensional view illustrating some components in the portable electronic device depicted in FIG. 3. As indicated in FIG. 3 and FIG. 4, the portable electronic device 100 of this embodiment includes a first body 110, a first pivot element 120, a shaft 130, a second pivot element 140, and a second body 150.

To be more specific, the first pivot element 120 is fixed to the first body 110. The shaft 130 has a first pivot 132, a second pivot 134, and a first block 136. The first pivot 132 is pivotally connected to the first pivot element 120 along a first axis A1 (shown in FIG. 4). The second pivot element 140 has a second block 142. Besides, the second pivot element 140 is pivotally connected to the second pivot 134 along a second axis $A_2$ (shown in FIG. 4) substantially parallel to the first axis A1. The second body 150 is fixed to the second pivot element 140.

Figure 5A:
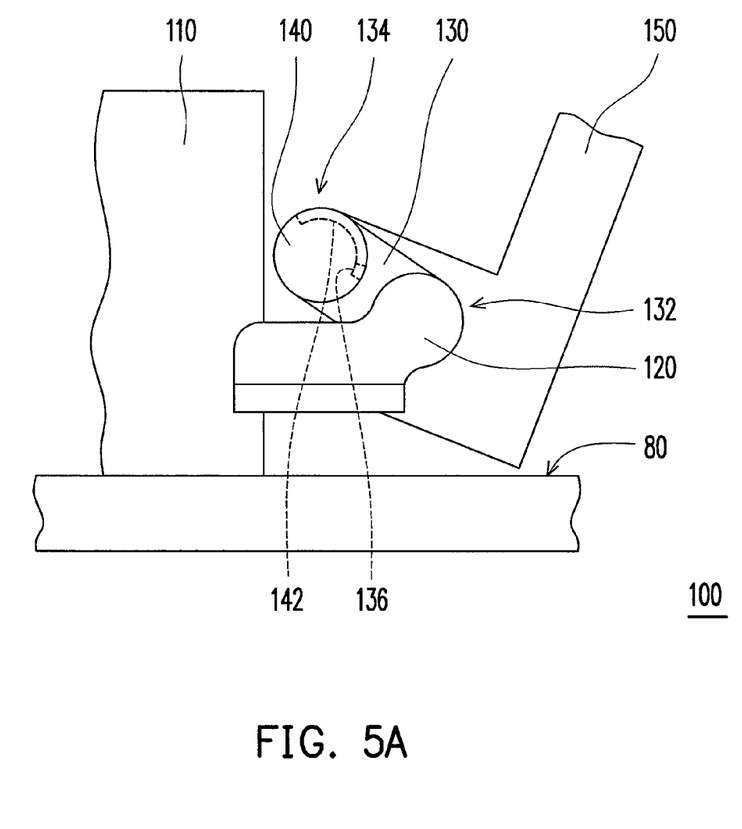
FIG. 5A and FIG. 5B are operational flow charts of the portable electronic device depicted in FIG. 3.
Figure 5B:
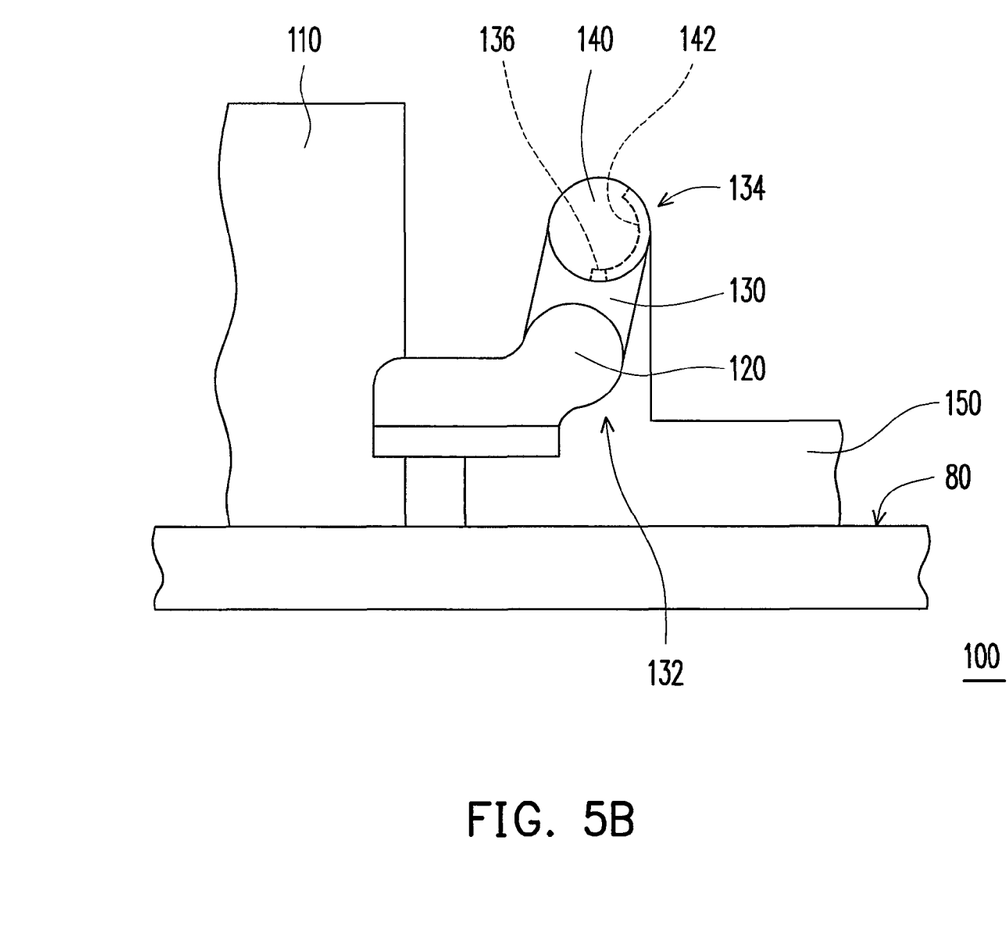

FIG. 5A and FIG. 5B are operational flow charts of the portable electronic device depicted in FIG. 3. In the above-mentioned configuration, when the second body 150 covering the first body 110 (shown in FIG. 3) rotates together with the second pivot element 140 that pivots relatively to the shaft 130 to form an included angle (shown in FIG. 5A) between the first body 110 and the second body 150, the second block 142 leans against the first block 136 to restrict the relative pivoting of the second pivot element 140 and the shaft 130. Thereby, the second pivot element 140 is no longer able to pivot relatively to the shaft 130. The second body 150 then continues to rotate together with the shaft 130 that pivots relatively to the first pivot element 120, such that the second body 150 is horizontally unfolded to form the 180-degree included angle between the first body 110 and the second body 150, as indicated in FIG. 5B.

When the rotation of the second body 150 is interrupted by a tabletop 80 (shown in FIG. 5A), the second body 150 cannot rotate along the second axis A2 (shown in FIG. 4) and cannot be horizontally unfolded (shown in FIG. 5B) to form the 180-degree included angle between the first and the second bodies 110 and 150. At this time, the second body 150 can rotate along the first axis A1 (shown in FIG. 4), such that the second body 150 can be horizontally unfolded to form the 180-degree included angle between the first and the second bodies 110 and 150. Accordingly, the relative pivoting range of the first body 110 and the second body 150 can be increased.

In this embodiment, the shaft 130 needs to resist a first friction force between the first pivot 132 and the first pivot element 120, such that the shaft 130 can pivot relatively to the first pivot element 120. Meanwhile, the shaft 130 also needs to resist a second friction force between the second pivot 134 and the second pivot element 140, so as to pivot relatively to the second pivot element 140. The second friction force is less than the first friction force.

Hence, when a user exerts a force on the second body 150 to unfold the second body 150 and form the 180-degree included angle between the first body 110 and the second body 150, the second pivot element 140 is driven to pivot relatively to the shaft 130, so as to complete the operation depicted in FIG. 3 to FIG. 5A. The second block 142 depicted in FIG. 5A leans against the first block 136, and the second pivot element 140 is restricted to be unable to pivot relatively to the shaft 130. Therefore, when the user keeps on exerting the force on the second body 150, the shaft 130 is driven to pivot relatively to the first pivot element 120, so as to complete the operation depicted in FIG. 5A to FIG. 5B.

With reference to FIG. 3, the portable electronic device 100 of this embodiment, for example, is a notebook computer, and the first body 110 and the second body 150 are the host and the display device of the notebook computer, respectively. The portable electronic device 100 further includes a battery 160 which is a bucket-shape battery adapted to the notebook computer. Besides, the battery 160 is disposed at the rear of the first body 110, and the battery 160 and the second axis A2 are coaxial (shown in FIG. 4). Note that the battery 160 is not depicted in FIG. 5A and FIG. 5B for better illustration.

In FIG. 5B, the second body 150 can be unfolded relatively to the first body 110 to form the 180-degree included angle between the second body 150 and the first body 110, and the second body 150 transversally lies down the tabletop 80. However, the pivoting range of the second body 150 relative to the first body 110 is not limited in this invention. For instance, the second body 150, if not interrupted by the tabletop 80, can be further unfolded relatively to the first body 110, so as to form an included angle greater than 180 degrees between the first body 110 and the second body 150.

Figure 6:
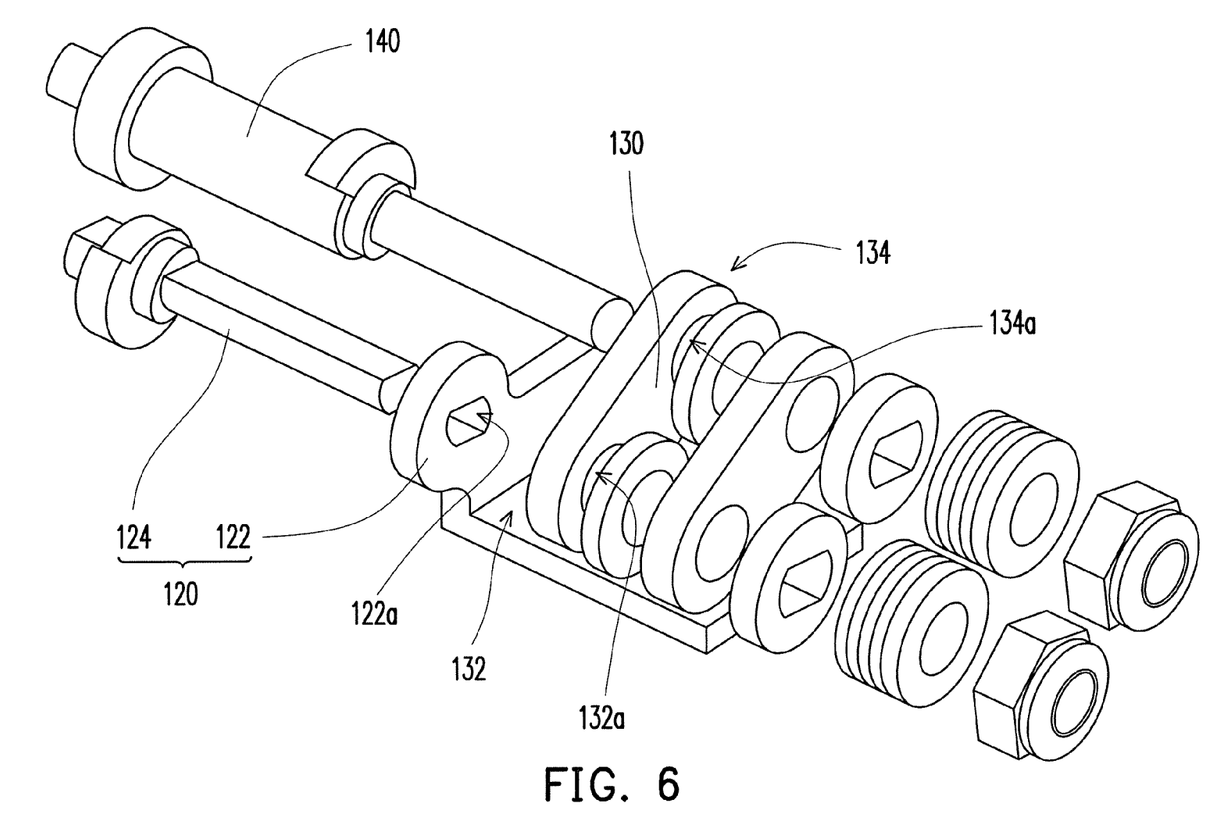
FIG. 6 is an exploded view illustrating some components in the portable electronic device depicted in FIG. 3.

FIG. 6 is an exploded view illustrating some components in the portable electronic device depicted in FIG. 3. With reference to FIG. 3 and FIG. 6, the shaft 130 of this embodiment has a hole 132a at the first pivot 132, and the first pivot element 120 includes a base 122 and a column 124. The base 122 is fixed to the first body 110 (depicted in FIG. 3) and has an assembling hole 122a. The column 124 is inserted into The assembling hole 122a and fixed to the base 122. Besides, the column 124 passes through the hole 132a and is pivotally connected to the first pivot 132. On the other hand, the shaft 130 has a hole 134a at the second pivot 134, and the second pivot element 130 passes through the hole 134a and is pivotally connected to the second pivot 134. The way to pivotally connect the first pivot element 120 and the second pivot element 140 to the shaft 130 is not limited in this invention. In other embodiments of the invention, other appropriate pivoting ways are also applicable.

In light of the foregoing, the first pivot element and the second pivot element are respectively fixed to the first body and the second body according to this invention, and the first pivot element and the second pivot element are pivotally connected to the shaft along the first axis and the second axis, respectively. The second body can rotate relatively to the first body along the second axis, so as to form the first included angle between the first and the second bodies. After that, the second body can rotate relatively to the first body along the first axis, so as to form the second included angle between the first and the second bodies. The second included angle is greater than the first included angle. When the rotation of the second body is interrupted by the tabletop, the second body cannot rotate along the second axis and cannot be horizontally unfolded to form the 180-degree included angle between the first and the second bodies. At this time, the second body can rotate along the first axis and can be horizontally unfolded to form the 180-degree included angle between the first and the second bodies. Namely, in this invention, the relative pivoting range of the first body and the second body can be increased. Moreover, the first block can be disposed on the shaft, and the second block can be disposed on the second pivot element. The first block and the second block structurally restrict the second pivot element that pivots relatively to the shaft. Thereby, the second body is controlled to rotate to an appropriate location when the second pivot element pivots relatively to the shaft, and then the second body rotates together with the shaft that pivots relatively to the first pivot element, such that the second body is horizontally unfolded to form the 180-degree included angle between the first and the second bodies.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A portable electronic device comprising:
   a first body;
   a first pivot element fixed to the first body;
   a shaft having a first pivot, a second pivot, and a first block, wherein the first pivot is pivotally connected to the first pivot element along a first axis, and the shaft suitable for resisting a first friction force between the first pivot and the first pivot element pivots relatively to the first pivot element;
   a second pivot element having a second block, wherein the second pivot element is pivotally connected to the second pivot along a second axis substantially parallel to the first axis, the second pivot element suitable for resisting a second friction force between the second pivot and the second pivot element pivots relatively to the shaft, and the second friction force is less than the first friction force;
   a second body fixed to the second pivot element, wherein when the second body covering the first body rotates together with the second pivot element pivoting relatively to the shaft to form a first included angle between the first and the second bodies, the second block leans against the first block to restrict the relative pivoting of the second pivot element and the shaft, after the second block leans against the first block, the second body continues to rotate together with the shaft pivoting relatively to the first pivot element to form a second included angle between the first and the second bodies, and the second included angle is greater than the first included angle; and
   a battery disposed at the rear of the first body, wherein the battery and the second axis are coaxial.

2. The portable electronic device as claimed in claim 1, wherein the shaft has a hole at the first pivot, and the first pivot element passes through the hole to pivotally connect the first pivot.

3. The portable electronic device as claimed in claim 2, wherein the first pivot element comprises:

a base fixed to the first body and having an assembling hole; and a column inserted into the assembling hole, passing through the hole at the first pivot, and pivotally connected to the first pivot.

4. The portable electronic device as claimed in claim 1, wherein the shaft has a hole at the second pivot, and the second pivot element passes through the hole to pivotally connect the second pivot.

5. The portable electronic device as claimed in claim 1, wherein the second included angle is substantially equal to 180 degrees.

6. A portable electronic device comprising:
a first body;
a first pivot element fixed to the first body;
a shaft having a first pivot, a second pivot, and a first block, wherein the first pivot is pivotally connected to the first pivot element along a first axis;
a second pivot element having a second block and pivotally connected to the second pivot along a second axis substantially parallel to the first axis;
a second body fixed to the second pivot element, wherein when the second body covering the first body rotates together with the second pivot element pivoting relatively to the shaft to form a first included angle between the first and the second bodies, the second block leans against the first block to restrict the relative pivoting of the second pivot element and the shaft, after the second block leans against the first block, the second body continues to rotate together with the shaft pivoting relatively to the first pivot element to form a second included angle between the first and the second bodies, and the second included angle is greater than the first included angle; and
a battery disposed at the rear of the first body, wherein the battery and the second axis are coaxial.

7. A portable electronic device comprising:
a first body;
a first pivot element fixed to the first body;
a shaft having a first pivot, a second pivot, and a first block, wherein the first pivot is pivotally connected to the first pivot element along a first axis, and the shaft suitable for resisting a first friction force between the first pivot and the first pivot element pivots relatively to the first pivot element;

a second pivot element having a second block, wherein the second pivot element is pivotally connected to the second pivot along a second axis substantially parallel to the first axis, the second pivot element suitable for resisting a second friction force between the second pivot and the second pivot element pivots relatively to the shaft, and the second friction force is less than the first friction force; and a second body fixed to the second pivot element, wherein when the second body covering the first body rotates together with the second pivot element pivoting relatively to the shaft to form a first included angle between the first and the second bodies, the second block leans against the first block to restrict the relative pivoting of the second pivot element and the shaft, after the second block leans against the first block, the second body continues to rotate together with the shaft pivoting relatively to the first pivot element to form a second included angle between the first and the second bodies, and the second included angle is greater than the first included angle.

8. A portable electronic device comprising:
a first body;
a first pivot element fixed to the first body;
a shaft having a first pivot, a second pivot, and a first block, wherein the first pivot is pivotally connected to the first pivot element along a first axis;
a second pivot element having a second block and pivotally connected to the second pivot along a second axis substantially parallel to the first axis; and
a second body fixed to the second pivot element, wherein when the second body covering the first body rotates together with the second pivot element pivoting relatively to the shaft to form a first included angle between the first and the second bodies, the second block leans against the first block to restrict the relative pivoting of the second pivot element and the shaft, after the second block leans against the first block, the second body continues to rotate together with the shaft pivoting relatively to the first pivot element to form a second included angle between the first and the second bodies, and the second included angle is greater than the first included angle.

* * * * *